(12) United States Patent
Corghi

(10) Patent No.: US 8,538,724 B2
(45) Date of Patent: Sep. 17, 2013

(54) APPARATUS AND METHOD FOR CHECKING THE ATTITUDE OF A VEHICLE

(75) Inventor: Giulio Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 445 days.

(21) Appl. No.: 12/885,795

(22) Filed: Sep. 20, 2010

(65) Prior Publication Data

US 2011/0077900 A1 Mar. 31, 2011

(30) Foreign Application Priority Data

Sep. 25, 2009 (IT) ............................... BO2009A0617

(51) Int. Cl.
*G01C 9/00* (2006.01)
*G01C 1/00* (2006.01)

(52) U.S. Cl.
USPC ........................................ 702/150; 356/139.1

(58) Field of Classification Search
USPC ............... 702/150, 33, 36, 81, 84, 94–95, 97, 702/127, 151–153, 155–158, 166–167, 170, 702/182–183, 188–189; 33/1 N, 203, 203.11–203.12, 203.18, 281–282, 33/285–286, 336, 503–504, 558.01, 558.4, 33/559–560, 700–701, 712, 772; 73/1.75, 73/1.79, 1.81, 115.07; 348/94–95, 135, 142, 348/180, 184, 190; 356/139.09, 139.1, 153–155; 382/106, 141
See application file for complete search history.

(56) References Cited

U.S. PATENT DOCUMENTS

| | | | |
|---|---|---|---|
| 6,115,927 A | 9/2000 | Hendrix | |
| 6,456,372 B1 | 9/2002 | Hudy | |
| 2003/0147068 A1* | 8/2003 | Corghi | ..................... 356/139.09 |
| 2004/0172170 A1 | 9/2004 | Lesert | |
| 2008/0148581 A1 | 6/2008 | Boni et al. | |

FOREIGN PATENT DOCUMENTS

| | | |
|---|---|---|
| EP | 0 895 056 B1 | 2/1999 |
| EP | 1 717 547 A1 | 11/2006 |
| WO | 00/70304 A1 | 11/2000 |
| WO | 2009/056392 A1 | 5/2009 |

* cited by examiner

Primary Examiner — Toan Le
(74) Attorney, Agent, or Firm — Pearne & Gordon LLP

(57) ABSTRACT

An apparatus (1) for checking the attitude of a vehicle (2) includes: at least one target (3) defining a spatial reference system; a mobile unit (4) adapted for measuring the value of parameters representing the geometric characteristics of the wheels of the vehicle (2), and for viewing the target (3); a processor (13) is connected to a camera (14) mounted on the mobile unit, for calculating the position of the wheel (9) relative to the reference system to calculate the attitude of the vehicle (2); an interface (23) is provided, designed to make available in real time to the user driving the mobile unit (4) information relating to the position of the camera (14) relative to the wheel (9), wherein the mobile unit (4) can be driven manually by a user to be positioned in proximity of the wheel (9).

19 Claims, 6 Drawing Sheets

APPARATUS AND METHOD FOR CHECKING THE ATTITUDE OF A VEHICLE

BACKGROUND OF THE INVENTION

This invention relates to an apparatus and a method for checking the attitude of a vehicle.

Checking the attitude of a vehicle is important to optimize road grip, driving comfort and tyre wear.

In effect, road grip and tyre wear depend on the adherence of the vehicle to the road surface which is in turn principally the result of the following two factors: the area of wheel contact with the road surface and wheel drift; both of these factors depend on the geometry of the vehicle's chassis and suspension.

The geometry of a vehicle chassis is defined precisely by the characteristic parameters of the vehicle's attitude, including the characteristic wheel angles, wheel track and pitch and other parameters such as suspension length. The correct values of these parameters are specified by the vehicle manufacturer and are usually variable according to the vehicle type and model.

In the light of this, checking the attitude of a vehicle involves measuring the real values of the above mentioned parameters in such a way that they can, if necessary, be modified and set to the correct values.

Thus, the devices used to check vehicle attitude are based on a suitable system for measuring the quantities which the characteristic attitude parameters depend on.

The quantities measured are then transmitted to a processor which uses appropriate mathematical and geometrical algorithms to calculate the characteristic wheel angles and, if necessary, other attitude parameters, compares them with the correct values for the vehicle being checked (the correct values, supplied by the vehicle manufacturer, are stored in a data base) and calculates and makes available to the operator the values measured and any corrections to be applied to the vehicle to make the characteristic parameters return within correct, specified ranges.

Thus, vehicle attitude checking apparatuses comprise measuring systems, or measuring means, for measuring the values of the parameters representing the geometric and positional characteristics of a wheel of the vehicle relative to a spatial reference.

At present, the measuring systems used can be grouped into the following two categories: those that take measurements (of the parameters representing the geometric and positional characteristics of a wheel) by direct contact with the wheel and those that take the measurements without direct contact with the wheel.

The measuring systems belonging to the first category generally comprise a plurality of measuring heads, each of which is designed to interact mechanically with a vehicle wheel and is equipped with suitable angular transducers, of mechanical or electronic type, capable of detecting the position and orientation of the head relative to a predetermined spatial reference system. The data measured may be transmitted to the processor by a cable or through a wireless system, for example by a radio or infrared system.

In the measuring systems belonging to the second category, the measuring heads are substituted by measuring instruments, generally of optoelectronic type, based on the capture and subsequent processing of images of the wheel or of a target associated with it, using one or more cameras.

These optoelectronic measuring instruments are designed to detect the position of a suitable target associated with the wheel, in such a way as to determine the equation of the tangent plane and of the wheel axis relative to a reference system integral with the measuring instrument.

Once the relation between the reference systems of the measuring instruments associated with the wheels is known, these systems are able to calculate the position and mutual orientation of the various wheels and to obtain from these the characteristic wheel angles and the other attitude parameters.

The targets are generally suitably shaped material bodies (for example, panels having an outside surface with predetermined properties) which are fixed to the vehicle wheels before the measurements are taken, or they may be generated by projecting laser beams or structured light beams on the vehicle wheels in such a way as to create plain lines going through the wheel or more complex, suitably encoded shapes (light tracks).

Other known optoelectronic measuring instruments do not use any type of encoded target and, instead, identify in the images captured by the cameras the position of actual lines on the wheels, such as, for example, the edge separating the rim from the tyre. A measuring instrument of this type is described in European patent application number EP0895056 in the name of the same Applicant as this invention.

Other optoelectronic measuring systems that do not require the use of targets associated with the wheel are those which use the three-dimensional imaging technology based on associating a depth measurement (Z-axis) with each pixel of the two-dimensional image captured by the camera (X- and Y-axes). These measuring systems can recognize the spatial position of the entire wheel relative to a reference system associated with the measuring system and, knowing the relation between the reference systems associated with the various measuring systems, can derive the relative orientations and positions between the wheels.

The three-dimensional imaging technology makes it possible not only to extract from the two-dimensional image in the X-Y reference system the characteristic parameters of interest (also referred to as "features"), but also to measure accurately the distances along the Z-axis between the image sensor and the object to be measured.

The sensors which use three-dimensional imaging technology are able to identify objects in three-dimensional space at a rate of more than 30 images per second (or 30 frames per second, abbreviated as FPS), allowing an adequate rate of updating the measured vehicle attitude data. These sensors require reception of light rays of known wavelength and which are reflected by the object to be measured in three-dimensional space. Other three-dimensional image sensors measure the distance in different ways, for example using the time of flight (TOF) of the light radiation or by processing information relating to the luminosity of the image received by the sensor.

Whatever the measuring method used, the optoelectronic measuring instruments used are normally mounted on suitable fixed structures from which they can locate the targets associated with the vehicle wheels or on portable structures that can be moved by the operator prior to measurement.

Portable systems usually comprise four units positioned near the wheels to be measured in such a way that they can see each other and determine their relative positions. This is essential, in systems of this kind, to place all the measuring instruments in suitable positions relative to the wheels of the vehicle system to be measured.

Also known in the prior art (as disclosed for example in patent document U.S. Pat. No. 6,456,372) are intermediate structures where the measuring instruments are movably mounted on fixed structures in such a way that their relative positions can be varied according to the size of the vehicle to be measured. For example, in patent document EP0895056 mentioned above, the measuring instruments are slidably mounted on a vehicle lift.

Measuring units mounted on self-propelled units are also known. These units move independently on the floor, following variable paths, in order to perform the operations necessary to determine the vehicle's attitude. Structures of this type are described in patent application number WO2009056392 in the name of the same Applicant as this invention.

The systems currently adopted briefly mentioned above, have some drawbacks, however.

In particular, the fixed or semi-fixed structures have the disadvantage of being rather cumbersome and thus occupying a lot of workshop space dedicated only to vehicle attitude adjustments.

These difficulties are made even worse when the vehicle to be checked is very large, as in the case, for example, of a lorry.

The disadvantage of mobile structures, on the other hand, is that before performing the measurement they have to be suitably positioned by the operator around the vehicle, with possible positioning errors appreciably lengthening working times. Moreover, the measuring units used must be equal in number to the number of wheels on the vehicle, to be checked simultaneously; typically there must be four units. These structures, too, have to be put away after use.

Self-propelled units which transport the measuring instruments independently require an adequate structure for moving the measuring instrument and processing the correct paths to be followed under all working conditions. Further, these self-propelled units must be provided with powerful batteries enabling them to work independently for sessions long enough to measure the attitude of several vehicles without stopping and such batteries considerably increase the weight and overall cost of a self-propelled unit.

Another drawback common to all the solutions mentioned above is the need to limit the working area in which to perform attitude measurements to a predetermined space. Thus, the measuring units (whether fixed or mobile) must always have a common spatial reference system which, typically, is permanently installed inside the working area.

In practice, all the attitude checking systems currently used require fixed structures to be installed in the working area for correcting attitude parameters. The fixed structures consist of vehicle lifts or, alternatively, pits, depending on the size and weight of the vehicles.

Statistical analysis of vehicle attitude parameter measurements, however, show that adjustments are necessary only on a limited number of vehicles, whereas the attitude parameters of most vehicles fall within acceptable limits.

Thus, to reduce total attitude measurement time, it would be desirable to have a measuring system or method capable of preventively selecting the vehicles that do not require adjustment.

In particular, the system described in patent document WO2009056392 has the drawback of being complicated and costly; in fact, it requires means for allowing the mobile unit to be moved automatically along a predetermined path.

This also brings other disadvantages mentioned above, regarding the fact that the system can only be used in a limited, predetermined area.

SUMMARY OF THE INVENTION

This invention has for an aim to provide an apparatus and a method that overcome the above-mentioned drawbacks of the prior art.

In particular, it is an aim of this invention to provide an apparatus and a method for checking vehicle attitude in a particularly quick and easy manner.

Another aim of the invention is to provide an apparatus and a method that make it possible to check the attitude of a vehicle located anywhere, even far from workshops where vehicle attitude parameters are normally corrected.

These aims are fully achieved by the apparatus and method according to the invention as characterized in the appended claims.

In particular, the vehicle attitude checking apparatus according to the invention comprises:
  at least one target defining a spatial reference system;
  a mobile unit that can be positioned manually by one user and equipped with measuring means for measuring the value of parameters representing the geometric characteristics of a vehicle wheel and its position relative to the mobile unit and with means for viewing the at least one target;
  a processor connected to the measuring means and to the viewing means for calculating the position and orientation of the wheel relative to the reference system and to obtain characteristic parameter values for the vehicle's attitude.

According to the invention the apparatus also comprises an interface designed to make available in real time to the user driving the mobile unit information relating to the position of the measuring means relative to the wheel, the mobile unit being able to be driven manually by one user to position it in proximity of (facing) the wheel.

In particular, the apparatus comprises an interface associated with the mobile unit and designed to make available in real time to the user manually driving the mobile unit information relating to the position of the measuring means relative to the wheel, whereby a user is allowed to manually drive the mobile unit and to position it in the proximity of the wheel.

In particular, the interface is mounted on the mobile unit. Hence, the mobile unit can be driven manually by one user to position it in proximity of (facing) the wheel and comprises an interface designed to make available in real time to the user driving the mobile unit information relating to the position of the measuring means relative to the wheel.

In fact, said information made available by the interface associated to the mobile unit provide the user with a feedback pertinent to the position of the mobile unit, allowing the user to manually adjust the position of the mobile unit with respect to the wheel retroactively, on the basis of said feedback.

Preferably, the interface is configured to display a visual feedback about the position of the mobile unit (with respect to the wheel).

It is to be noted that the mobile unit is configured to be moved (i.e. driven) manually by the user, either directly (i.e. applying muscular strength to the mobile unit to move it) or indirectly (e.g. manually driving a control device, as a joystick for instance, associated to the mobile unit and connected to a motor or any other actuator adapted to move the mobile unit in response to the action of the user.

Thus, the invention makes available a vehicle attitude checking apparatus comprising at least one measuring unit installed on a mobile unit that is transported manually in front of each single vehicle wheel in order to measure the position of the wheels (that is, wheel position and orientation in space) one at a time and at different moments in time.

The mobile unit comprises a trolley that can be easily moved and positioned by the user (that is, the operator responsible for checking the vehicle's attitude).

The trolley constitutes a mounting structure for the measuring means, which operate on the vehicle wheel for measuring the geometric parameters of interest, and for the target viewing means.

It should be noted that the measuring means may comprise a mechanical contact but preferably comprise optic means for capturing wheel images. These images are transmitted to the processor which uses them to calculate the geometric parameters of interest.

The interface mounted on the mobile unit (that is, on the trolley) enables the user to position the trolley in front of the vehicle wheel very quickly and easily and to perform the measurement almost instantaneously.

That means, advantageously, that there is no need for any form of fixed installation or complex and expensive system for guiding and positioning the measuring means.

According to the invention, all that is needed to check the vehicle's attitude can be transported manually and conveniently positioned by the user. In effect, all that the user has to do is place the target (constituting the coordinate reference for measuring a given vehicle) near the vehicle (without necessarily fixing it to the vehicle) and position the trolley in front of each of the wheels, one at a time, according to the instructions of the interface.

Thus, the vehicle whose attitude is to be checked may be located anywhere in the workshop, in an outdoor yard or in any other place (even the vehicle owner's home) provided the trolley and target are transported to the place where the vehicle is located.

The method for checking vehicle attitude according to the invention comprises the following steps:
  preparing at least one target defining a spatial reference system;
  positioning the target near the vehicle;
  preparing a mobile unit equipped with measuring means for measuring the value of parameters representing the geometric characteristics of a vehicle wheel and its position relative to the mobile unit and with means for viewing the at least one target;
  preparing a processor connected to the measuring means and to the viewing means for calculating the position and orientation of the wheel relative to the reference system and to obtain characteristic parameter values for the vehicle's attitude.

Further, the method according to the invention comprises a step of positioning the mobile unit relative to a wheel by being manually driven by one user in such a way as to enable the measuring means to measure the value (of the characteristic parameters of the vehicle's attitude) and simultaneously allow the viewing means to see the at least one target, and a step of displaying in real time to the user driving the mobile unit the information relating to the position of the measuring means relative to the wheel, this positioning step being repeated for all the wheels on the vehicle to be measured.

Hence, the method according to the present invention comprises the steps of:
  manually driving the mobile unit to position it relative to one of the wheels, in such a way as to enable the measuring means to measure the value and simultaneously allow the viewing means to see the at least one target;
  displaying in real time to a user who is manually driving the mobile unit information relating to the position of the measuring means relative to the wheel, said positioning step being repeated for all the wheels on the vehicle to be measured.

Thus, in the method according to the invention, the geometric parameters of the wheels can be measured by a single mobile unit positioned manually in front of one wheel after the other at different moments in time.

Thanks to this solution, the measuring system occupies workshop space only for the lapse of time during which the vehicle is measured.

Another advantage of the system according to the invention is that it does not physically limit the area in which to perform measurement, which may also be an area outside the workshop.

A further advantage of this invention is that it can increase the productivity of attitude measuring lines. In effect, identifying, outside the workshop, the vehicles that require adjustment saves the time that would be needed to position on an adjustment site, for example a lift, all the vehicles that do not require adjustment because the values of their attitude parameters fall within acceptable limits.

Another advantage of the solution according to the invention is its ease of use: after placing near the vehicle the target used to obtain the reference system common to all the measurements performed on the vehicle, the user (that is, the operator) places the mobile unit in front of the wheel in the optimum measuring position. During the positioning step, the user is assisted by a graphic interface that indicates in real time the movements necessary to place the mobile unit in the optimum measuring conditions.

Yet another advantage of the invention is linked to the extreme flexibility with which the measurements can be performed: as will become clearer as this description continues, the sequence of the measurements on the individual wheels can be decided at the operator's discretion and, when in doubt, the operator can repeat a measurement even on just one wheel.

Yet another advantage of the invention is that the entire measurement can be performed by a single mobile unit that requires a limited number of energy consuming components, thus reducing battery weight (battery energy is required only for the interface, the measuring means and the viewing means) and the overall cost of the system.

BRIEF DESCRIPTION OF THE DRAWINGS

These and other characteristics of the invention will become more apparent from the following detailed description of a preferred, non-limiting embodiment of it, with reference to the accompanying drawings, in which.

DESCRIPTION OF THE PREFERRED EMBODIMENTS

Figure 1:
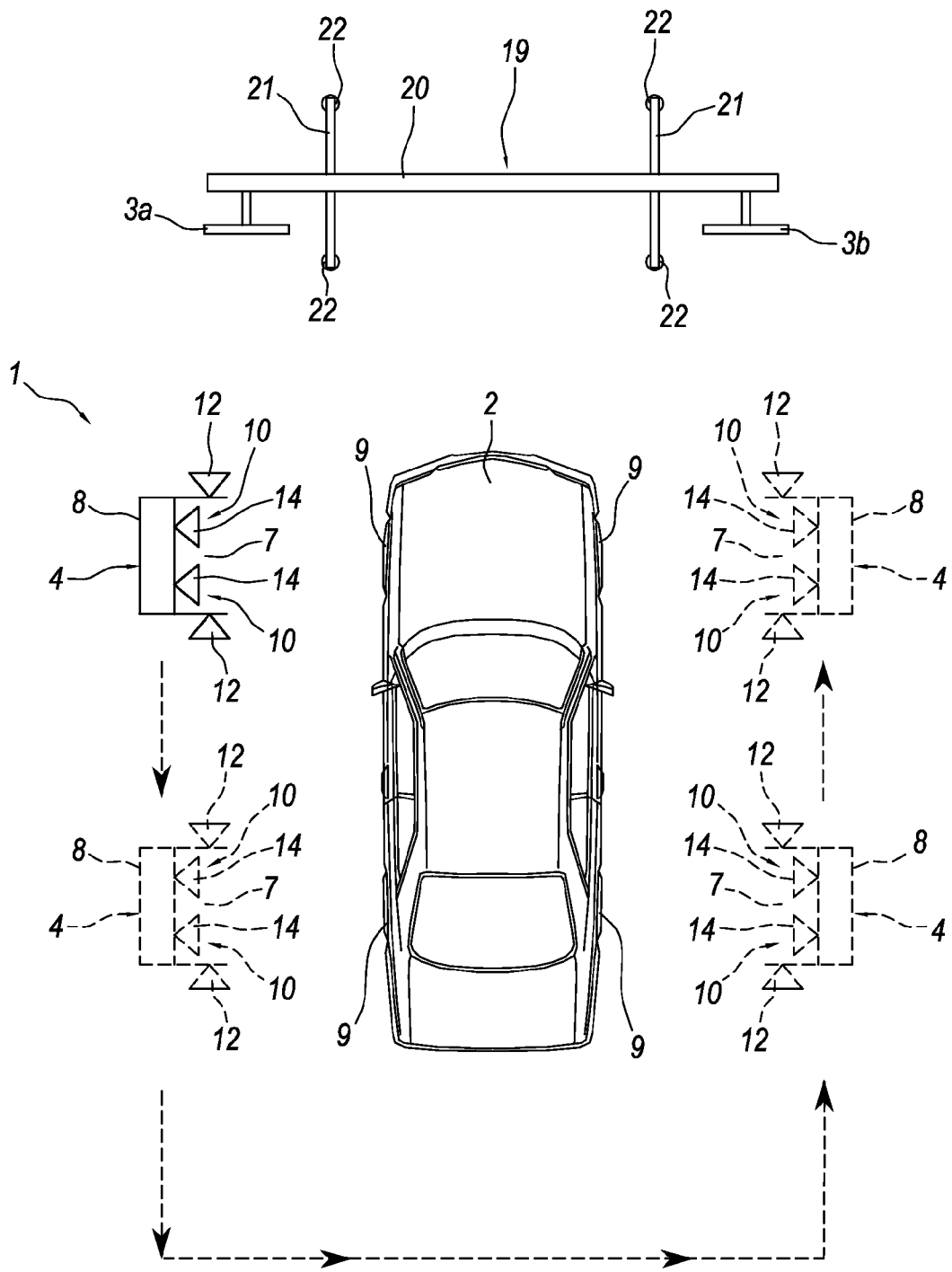
FIG. 1 is a plan view schematically illustrating an apparatus according to the invention.
Figure 3:
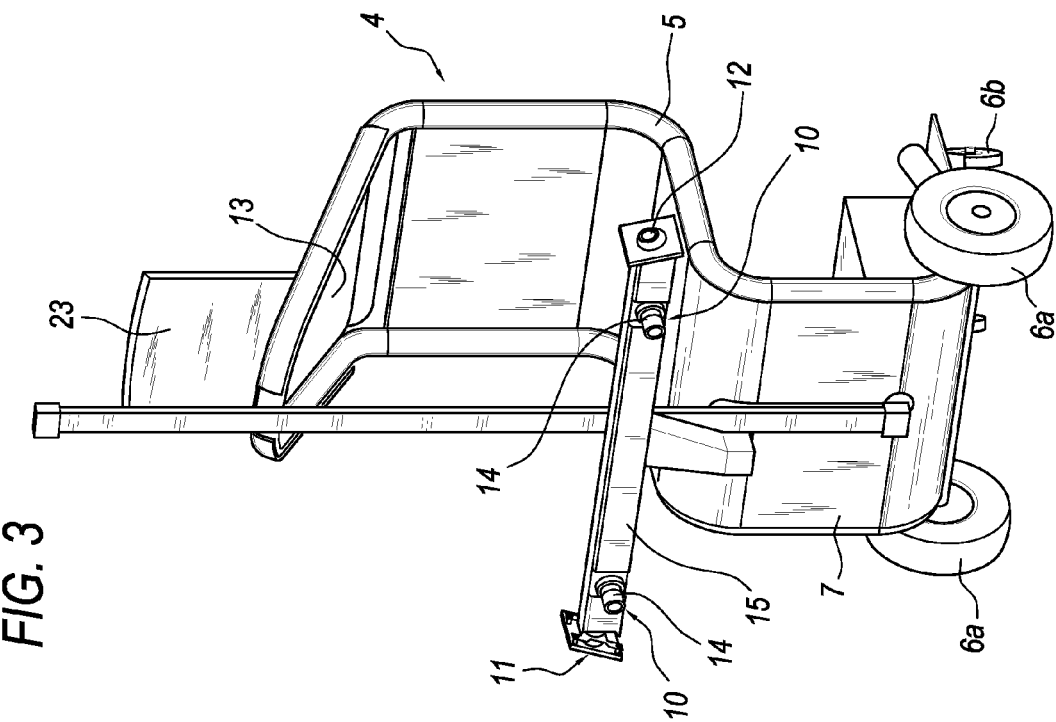
FIG. 3 is a front perspective view of the mobile unit of FIG. 2.
Figure 2:
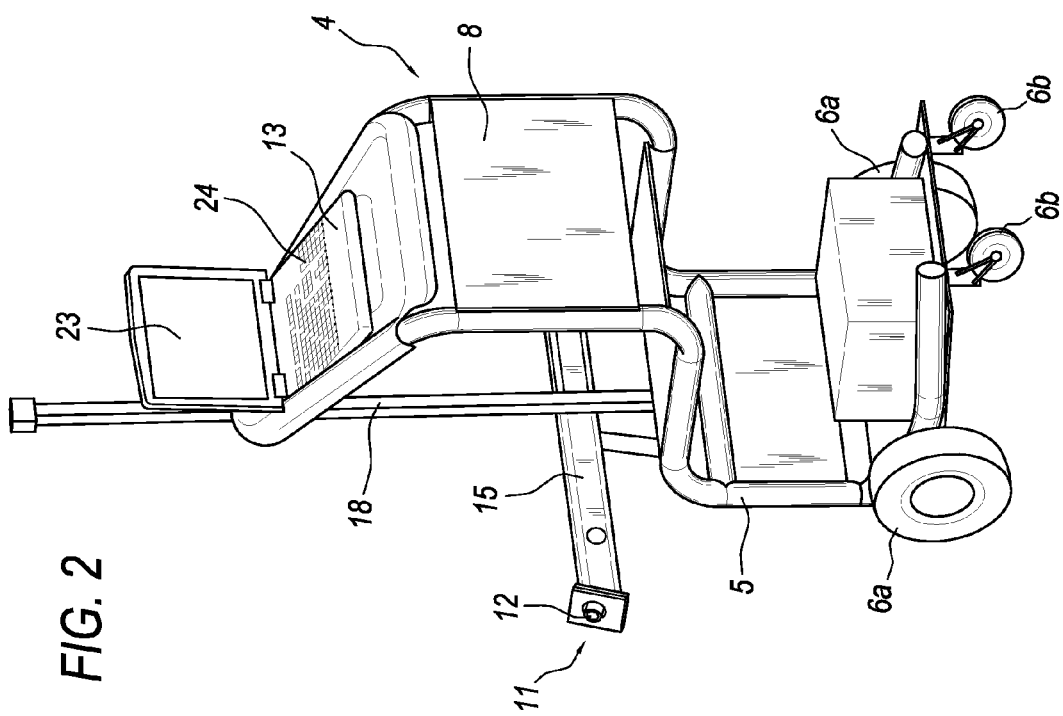
FIG. 2 is a rear perspective view illustrating the mobile unit of the invention.
Figure 4:
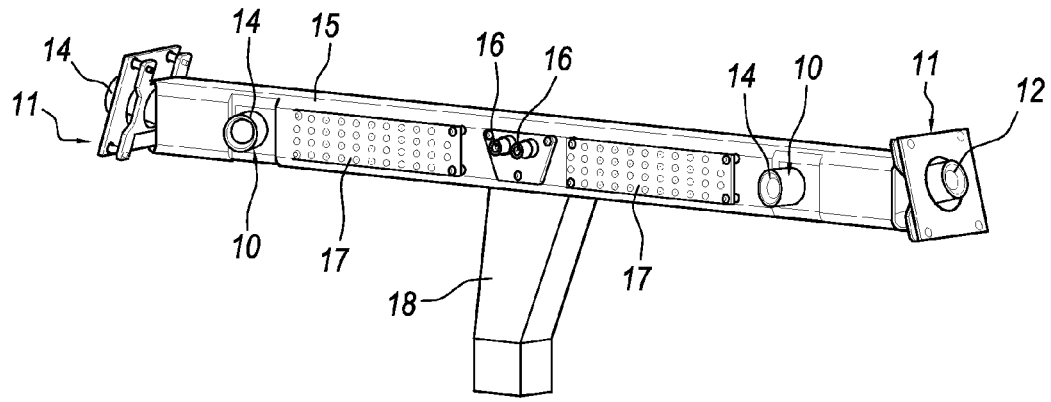
FIG. 4 illustrates a detail of the mobile unit of FIG. 2.

The numeral 1 in the accompanying drawings denotes an apparatus for checking the attitude of a vehicle 2.

The vehicle 2 is a vehicle equipped with wheels 9, such as a motor car or a lorry.

The apparatus 1 comprises at least one target 3 (labelled 3a or 3b in FIG. 1) defining a spatial reference system. As is known in the prior art, the target 3 comprises, for example, a panel having a surface whose geometric characteristics can be measured optically.

The apparatus also comprises a mobile unit 4 that can be positioned manually by one user (namely, the operator responsible for checking the attitude of the vehicle 2).

The mobile unit 4 preferably comprises a trolley 5 equipped with a plurality of wheels 6 for moving the trolley 5. At least one of the wheels 6 is of the swiveling type to make it easier to position the measuring unit.

It should be noted that the mobile unit 4 comprises a front portion 7 (i.e. the front of the trolley) and a rear portion 8 (i.e. the rear of the trolley).

In the light of this, some of the wheels 6a (two in the example illustrated, but they might also differ in number) are rotatably mounted on a frame of the trolley 5 at the front 7 and other wheels 6b (two in the example illustrated, but they might also differ in number, even only one) are rotatably mounted on the frame of the trolley 5 at the rear 8.

Preferably, the rear wheels 6b are of the swiveling type.

It should be noted that the trolley 5 is preferably equipped with handles or handgrips to make it easier for the user to push the trolley 5 and guide it to the desired position in front of the vehicle wheel 9.

Thus, the mobile unit 4 is adapted for easy handling (for example to move it over the workshop floor or over the ground in the yard outside the workshop) so that it can be moved in any direction in an XY plane (defined by the floor or the ground) and turned around itself about a vertical axis Z.

The mobile unit 4 also comprises measuring means 10 for measuring the parameters representing the geometric characteristics of a vehicle 2 wheel 9 and its position relative to the mobile unit 4.

The mobile unit 4 therefore mounts a measuring unit (that is, the measuring means 10) designed to directly measure the geometrical data of the wheels 9 of the vehicle 2 on which the characteristic attitude parameters depend.

The geometric data (that is, the parameters representing the geometric characteristics of the vehicle 2 wheel 9 and its position relative to the mobile unit 4) comprise, for example: the position of the axis of symmetry of the wheel and the position of the plane tangent to the wheel perpendicular to the axis of symmetry.

Thus, by moving the mobile unit 4 (by acting on the trolley 5), the user also moves the measuring means 10 mounted on it, allowing them to be placed near the wheel 9 in the optimum position for measuring the geometric parameters.

In the light of this, it should be noted that preferably the measuring means 10 are adjustably mounted on the mobile unit 4 in such a way that they can be moved vertically (along the Z-axis).

That allows the position of the measuring means 10 relative to the ground or floor to be varied (that is, the height of the measuring means 10 can be adjusted) during the positioning step.

When the mobile unit 4 is equipped with vertically adjustable measuring means 10, the expression "position of the wheel 9 relative to the mobile unit 4" means the position of the wheel 9 relative to a reference system integral with the measuring means 10 mounted on the mobile unit.

The mobile unit 4 also comprises means 11 for viewing the at least one target 3 and comprising one or more cameras 12 for viewing the target 3 and hereinafter referred to as range cameras 12.

It is stressed that the measuring means 10 are rigidly connected to the viewing means 11. That way their mutual position does not change either when the mobile unit 4 is moved or when the measuring means 10 are moved vertically.

The apparatus 1 further comprises a processor 13 connected to the measuring means 10 and to the viewing means 11 for calculating the position and orientation of the wheel relative to the reference system (that is, coordinate reference system) defined by the target 3 and to obtain the values of the characteristic attitude parameters of the vehicle 2.

By way of non-limiting example, the characteristic attitude parameters include the following: left, right and total front wheel alignment; left, right and total rear wheel alignment; right and left front wheel camber; right and left rear wheel camber; right and left caster; right and left king-pin; front and rear set-back; thrust angle; front track; rear track; track difference; right wheelbase; left wheelbase.

In the example illustrated, the processor 13 is a personal computer but may be any other known computing instrument.

Preferably, the processor 13 is associated with the mobile unit 4 (that is, mounted on the mobile unit 4) but it is also possible to install the processor 13 in another place and provide a communication system (of known type, for example, a wireless system) in order to transmit data from the measuring means 10 and from the viewing means 11 to the processor 13 (and vice versa).

As regards the measuring means 10, it should be noted that according to the invention they may be of any known type.

For example, the measuring means 10 might comprise mechanical contacts (not illustrated in the drawings, of a per se known type) mounted on movable arms so that they can be moved from a retracted position of non-interference with the wheel 9, to an extended position where they are operatively in contact with the wheel 9 to measure its geometrical data.

Alternatively, the measuring means 10 may comprise a combination of arms integral with each other and designed to be placed in contact with the wheel, and a camera associated with the mobile unit 4 which frames the wheel and determines its position, in particular, the position of the wheel centre (meaning by this the intersection of the tangent plane and the axis of symmetry of the wheel), relative to the mobile unit 4.

However, in the preferred embodiment illustrated, the measuring means 10 are designed to measure the above mentioned geometrical data of the wheel 9 without coming into direct contact with it.

In the light of this, the measuring means 10 preferably comprise at least one camera 14 (hereinafter referred to as measuring camera 14) designed to frame at least one portion of the vehicle 2 being checked and to capture at least one image of the wheel 9.

In particular, the measuring means 10 preferably comprise two cameras 14 (that is, a pair of cameras 14) in a stereo setup.

In the light of this, the processor 13 is designed to create from the images captured by the pair of cameras 14 a digital representation of the wheel 9 in a reference system integral with the measuring cameras 14.

Further, since the relation between the relative position between the measuring cameras 14 and the viewing means 11 is known, the processor can also create, from the images of the target 3 captured by the viewing means 11, the digital representation of the wheel 9 relative to the spatial coordinate system defined by the target 3.

It should be noted that the fact of using two measuring cameras 14 in a stereo setup advantageously makes it possible to use the images thus captured to derive highly reliable information for measuring the geometrical data of the wheel 9. That does not, however, exclude that the measuring means 10 might comprise only one measuring camera 14 or, alternatively, three or more measuring cameras 14, depending on the degree of precision required of the measuring means 10.

In the embodiment illustrated, the apparatus 1 comprises a supporting bar 15 which the cameras 14 are associated with. The cameras 14 are associated with the bar 15 in such a way as to be spaced from each other and oriented so that they can capture images of a wheel 9 of the vehicle 2 from different angles.

Further, the mobile unit 4 is equipped with a laser or structured light projector 16.

In this regard, it should be noted that the mobile unit 4 also comprises a plurality of light projectors 16. Further, the projectors are designed to project complex and suitably encoded light drawings (tracks).

Preferably, the mobile unit 4 is also provided with a measurement illuminator 17 designed to illuminate the wheel 9 while measurements are in progress. Preferably, the measurement illuminator 17 uses infrared light and the cameras 14 are able to capture infrared images, so as to avoid problems for the operator during measurement operations and to optimize wheel 9 position identification even in the presence of sunlight.

In the example illustrated, the illuminator 17 comprises a plurality of luminous bodies.

Preferably, the light projector 16 (which in the example illustrated comprises a pair of projector elements) is also associated with the bar 15, preferably at a central position (intermediate between the measuring cameras 14 of said pair).

Preferably, the illuminator 17 is also associated with the bar 15, more preferably at a position intermediate between the measuring cameras 14 of said pair and the projector 16.

The range camera 12 is preferably also associated with the bar 15.

The mobile unit 4 preferably comprises two range cameras 12 mounted at opposite ends of the bar 15 and directed substantially along the axis of the bar 15 in opposite, diverging directions.

In particular, the mounting bar 15 is positioned horizontally (that is to say, parallel with a supporting surface of the mobile unit 4 defined by the floor or ground) and is movably associated with a vertical member 18 of the trolley 5 (that is, of the mobile unit 4).

Preferably, the mounting bar 15 is associated with the vertical member 18 at a centreline of the bar 15 itself. The vertical member 18 thus defines an axis of symmetry for the bar 15.

The measuring cameras 14 are therefore preferably mounted symmetrically about said axis of symmetry.

In the example illustrated, the light projector 16 positioned at the centre of the mounting bar 15 and is oriented in the same direction as the measuring cameras 14 so as to project on the outside lateral surface of the wheel 9 two light blades at right angles to each other which cut the wheel in an approximate diametrical direction, thereby generating on the side of one tyre of the wheel 9 four light tracks spaced at equal angular intervals.

The measuring cameras 14 and the range cameras 12 may use both CCD (charge-coupled device) sensors and C-MOS (complementary metal-oxide semiconductor) sensors and may be either black and white or colour cameras.

Both the measuring cameras 14 and the range cameras 12 can be equipped either with a fixed optical system or with a variable optical system capable of adjusting one or more optical characteristics of the images, such as, for example, field of vision, zoom factor, focus, focal length, position of optical axis, lens aperture or depth of field.

In particular, the variable optical system (not illustrated in the drawings, being per se of known type) may comprise a system of adjustable lenses moved by suitable mechanical actuators, or it may comprise a modern fluid lens system using as light focusing lens the interface zone between two immiscible fluids.

Thus, the measuring means 10 and the viewing means 11 are preferably associated with the mounting bar 15.

The mounting bar 15 is movably associated with the vertical member 18 of the mobile unit 4 and is slidably movable in a vertical direction for adjusting its height from the floor or ground.

The movement of the bar 15 is achieved by customary movement means (not illustrated) that can be operated manually or by actuators.

Preferably, the vertical member 18 is rotatably coupled to the trolley 5 (that is, to a frame of the mobile unit 4) in such a way that it can turn about itself and at the same cause the measuring unit (that is, the measuring means 10) and the viewing unit (that is, the viewing means 11) to turn about a vertical axis z.

It should be noted that, to enable the processor 13 to calculate the attitude parameters correctly from the data captured by the measuring means 10, the data for all the wheels 9 of the vehicle 2 must be referenced to the same reference system, or spatial coordinate system.

That is made possible by the target 3, which is held stationary during measurements performed on the wheels 9 of the same vehicle 2, and by the viewing means 11 mounted on the mobile unit 4 and designed to see the target 3 in all the working positions adopted by the mobile unit 4, that is to say, all the positions where the mobile unit is positioned in front of one of the wheels 9 to be measured in order to allow the measuring means 10 to capture the characteristic geometrical parameters of the wheels.

In the light of this, it should be noted that the measuring cameras 14 are calibrated using tried and tested methods well known in the trade, and hence reliable, and that calibration methods well known in the trade are also used to determine the relationship (that is, the mathematical, geometrical relation) between the reference systems associated with the range cameras 12 and of the measuring cameras 14.

In particular, since the fields of vision of the measuring cameras 14 and of the range cameras 12 may be completely disjoined, calibration which allows the reference systems of the measuring cameras 14 to be linked to those of the range cameras 12 is accomplished using a calibration bar with two targets of known, for example chequered, type mounted at the ends of it.

Preferably, the target 3 is fixed to a mounting structure 19 designed to be moved manually by the user to the required position near the vehicle 2.

In particular, in the embodiment illustrated in FIG. 1, the apparatus 1 comprises a first target 3a and a second target 3b defining the spatial reference system.

The targets 3 (that is, 3a and 3b) are fixed to the mounting structure 19 in a predetermined (and fixed) position relative to one another.

The spatial reference (that is, coordinate) system defined by said pair of targets 3 is especially advantageous because it means that at least one of the targets 3 is always within the field of vision of at least one of the range cameras 12.

Thus, the reference system according to the preferred embodiment of FIG. 1 comprises a pair of targets 3 (that is, 3*a* and 3*b*) fitted integrally with the ends of a connecting bar 20 mounted on a pair of trestles 21 equipped with wheels 22 that swivel about respective vertical axes. The bar 20, trestles 21 and wheels 22 make up the above mentioned mounting structure 19.

The reference targets 3 are of a type known in the vehicle attitude checking trade, for example, of the type described in European patent application number EP1717547 in the name of the same Applicant as this invention.

It is underlined that the choice of a reference system with two targets 3 aligned by means of a connecting bar 20 is dictated by the need for positioning convenience and to reduce overall system costs. That does not, however, exclude the possibility of using three or more reference targets 3 having known relative positions (or a single target).

In the light of this, it should be noted that according to the invention the apparatus 1 comprises at least a first and a second target 3, separate from each other and designed to be positioned near opposite ends of the vehicle 2 (one near the front end of the vehicle 2 and the other near the rear end of the vehicle 2).

In this case, before starting to measure the attitude of the vehicle 2 and before the latter is positioned in the area where it is to be measured, the mobile unit 4 must be placed in such a way that the range cameras 12 are able to frame the targets 3 positioned on both sides (on opposite side relative to the vehicle 2) and their positions relative to one another must be determined using the above mentioned calibration methods.

In particular, the calibration method described is used to link the systems associated with the range cameras 12 to those of the measuring cameras 14 and combining these links makes it possible to identify the relative positions of the range cameras 12. The image captured by each range camera 12 can be used to determine the position of the framed target 3 relative to the range camera itself. Combining this spatial data makes it possible to map the relative position between the first and second targets 3.

Alternatively, the operations described above can be performed by framing the targets 3 with the measuring cameras 14 or using the range cameras 12 and the measuring cameras 14 in combination.

If a configuration of this kind is used for the reference system and the targets are positioned on opposite sides of the vehicle 2, the mobile unit 4 need be equipped with only one range camera 12. In effect, with this configuration, there is always at least one target 3 positioned on the same side as the measuring unit 4, whether the mobile unit 4 is on the right- or left-hand side of the vehicle 2.

Figure 5:
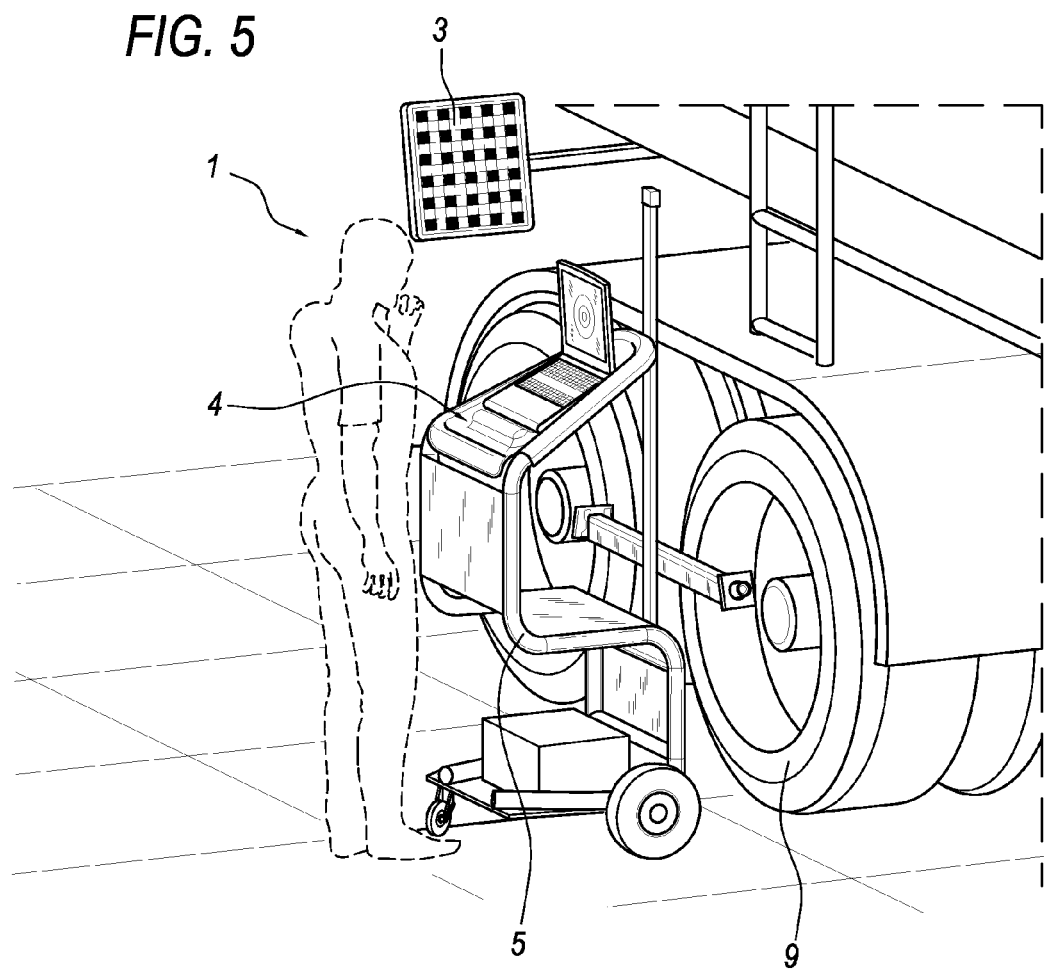
FIG. 5 is a perspective view showing the apparatus of FIG. 1 applied to a lorry.

Further, FIG. 5 shows an alternative configuration of the apparatus 1 where the reference system is composed of one or more targets 3 fixed to a chassis of the vehicle 2. That is advantageous when the vehicle 2 to be checked is very large (as in the case of a lorry, for example).

According to the invention the apparatus 1 also comprises an interface 23 designed to make available in real time to the user driving the mobile unit 4 information relating to the position of the measuring means 10 relative to the wheel 9 and, preferably, relating to the position of the viewing means 11 relative to the target 3.

Preferably, the interface 23 is associated with the mobile unit 4 (that is, mounted on the mobile unit 4). Alternatively, the interface 23 might comprise a screen located at a fixed position visible, from any position near the vehicle 2, to the user driving the mobile unit manually.

Preferably, the interface 23 can be oriented in such a way that it can be positioned correctly and seen in optimal manner by the user of the mobile unit 4.

In the light of the above, the interface 23 comprises a screen mounted adjustably on the mobile unit 4 to be oriented in such a way as to facilitate viewing by a user located near the mobile unit 4. In particular, the screen preferably rotates about a vertical axis to be turned in such a way that it can be viewed optimally by a user located on one side of the mobile unit 4.

In the example illustrated, the interface 23 comprises a monitor. The monitor is preferably coupled to the processor 13, forming part of the same personal computer, for example.

The interface 23 is preferably connected to the measuring cameras 14 so that the images captured by the cameras 14 are displayed in real time.

The interface is preferably also connected to the range cameras 12 so that the images captured by the cameras 12 are displayed in real time.

From the practical viewpoint, in the embodiment illustrated, the interface 23 is connected to the processor 13 and thus also to the measuring cameras 14 and to the range cameras 12 (which are in turn connected to the processor 13). It is not, however, essential for the interface 23 to be connected to the processor 13 (although it is preferably because it is a particularly simple and functional solution) since the interface 23 might receive the images captured directly from the measuring camera 14 (or cameras 14) and display them.

It is, however, underlined that it is preferable for the interface 23 to be connected to the processor. In effect, the interface 23 also serves to give the user information about the measurements processed by the processor 13 and on the state of measurement. Moreover, the cameras 12 and 14 are connected to the processor 13 because the latter has to map the spatial position of the wheel and of the targets.

It should be noted that if the measuring means 10 are of the mechanical type, the apparatus preferably comprises a camera (or equivalent viewing means) mounted on the mobile unit 4 in order to obtain information about the mobile unit 4 itself.

Instead of to the camera the processor 13 might be connected to a spatial positioning system comprising distance sensors (for example, ultrasound or laser sensors). Operatively, the trolley is moved sideways in such a way that the distance sensor detects the outside edges of the wheel, after which the mobile unit 4 is placed at an intermediate position between the end positions where the sensor is aligned with the outside edges of the wheel.

It should be noted that the invention also contemplates the possibility of using the system based on the position sensors to provide the information made available by the interface regarding the position of the measuring means relative to the wheel.

In the preferred embodiment, where the measuring means 10 comprise measuring cameras 14 designed to frame at least one portion of the vehicle 2 being checked (to capture at least one image of the wheel 9), the interface 23 is adapted to tell the user driving the mobile unit 4 whether the wheel 9 is within the field of vision of the measuring camera 14.

Thus, the interface 23 comprises a monitor designed to display the data received from the processor 13 (and/or the data received directly from the measuring means 10 and from the viewing means 11).

It should be noted that the processor 13, besides processing the images captured by the range cameras 12 and by the measuring cameras 14, is also programmed to drive the light projector 16 and the illuminators 17.

Preferably, the processor 13 is connected to the interface 23 in such a way that the user can see the part of the wheel 9 framed by the measuring cameras 14 and the target 3 framed by one of the range cameras 12 and can easily position the mobile unit 4 in the optimum capturing position.

The processor 13 is also connected to a keyboard 24 allowing the user to enter commands necessary to perform measurement. Alternatively, the interface 23 may be of the touchscreen type to be able to integrate the functions of the keyboard, that is to say, to receive commands from the operator. Alternatively, the keyboard 24 might be substituted by a microphone and a voice recognition system built into the processor 13 designed to recognize voice commands necessary to perform the measurement.

Thus, the keyboard 24 is designed to receive commands from the operator.

Preferably, as in the example embodiment illustrated, the keyboard 24 is the keyboard of the personal computer, although different types of devices, such as wireless keyboards, can also be used.

It should be noted that in another embodiment, not illustrated, the interface 23 comprises an audible alarm and/or visual indicator means (for example arrows or warning lights designed to switch on and off) to tell the user driving the mobile unit 4 how to move the mobile unit 4 (and, if necessary, also the measuring means 10 independently of the mobile unit 4) in order for the measuring means 10 to be correctly positioned, and when the image capturing conditions are acceptable or optimal.

The processor 13 also comprises a mass memory unit in which to store the data bases containing useful information about the vehicles 2 and, in particular, the correct values of the characteristic attitude parameters and wheel size, for every make and model of the vehicle 2 that can be checked by the system 1.

Preferably, the mobile unit 4 also comprises a rechargeable battery for powering the processor 13, the measuring means 10, the viewing means 11, the projector 16 and the illuminator 17.

The battery (not illustrated, being per se of well known type) is preferably installed on the mobile unit 4 and is adapted also to power any electric actuators used to enable the bar 15 to slide vertically along the vertical member 18 and/or to rotate the vertical member 18 about its axis.

Optionally, the apparatus may be provided with a printer, not illustrated, to make printed reports of the measurements taken and of the reference values. The printer may be mounted on the mobile unit 4 or it may be placed in a remote location and connected to the processor 13 by a wireless connection. In addition to or instead of the printer, the processor 13 might be equipped with a port for saving data to a digital storage memory (for example a disk or USB flash drive).

It should be noted that preferably the measuring means 10 (and the bar 15) are also associated with the front portion 7 of the mobile unit 4 and are substantially directed in a longitudinal direction towards the outside of the mobile unit 4.

In the light of the above, it should be noted that the viewing means 11 preferably comprise two range cameras 12 substantially directed transversally in opposite sideways directions.

The interface 23 comprises a screen oriented in such a way as to be visible to the user located at the rear portion 8 of the mobile unit 4.

That means the operator can measure the wheels 9 with extreme ease even in confined spaces.

Thus the processor 13 is programmed to make available to the user through the interface 23 a plurality of indications for positioning the mobile unit 4 relative to the wheel 9 and, more generally speaking, for performing the measurements necessary to check vehicle attitude.

Figure 6:
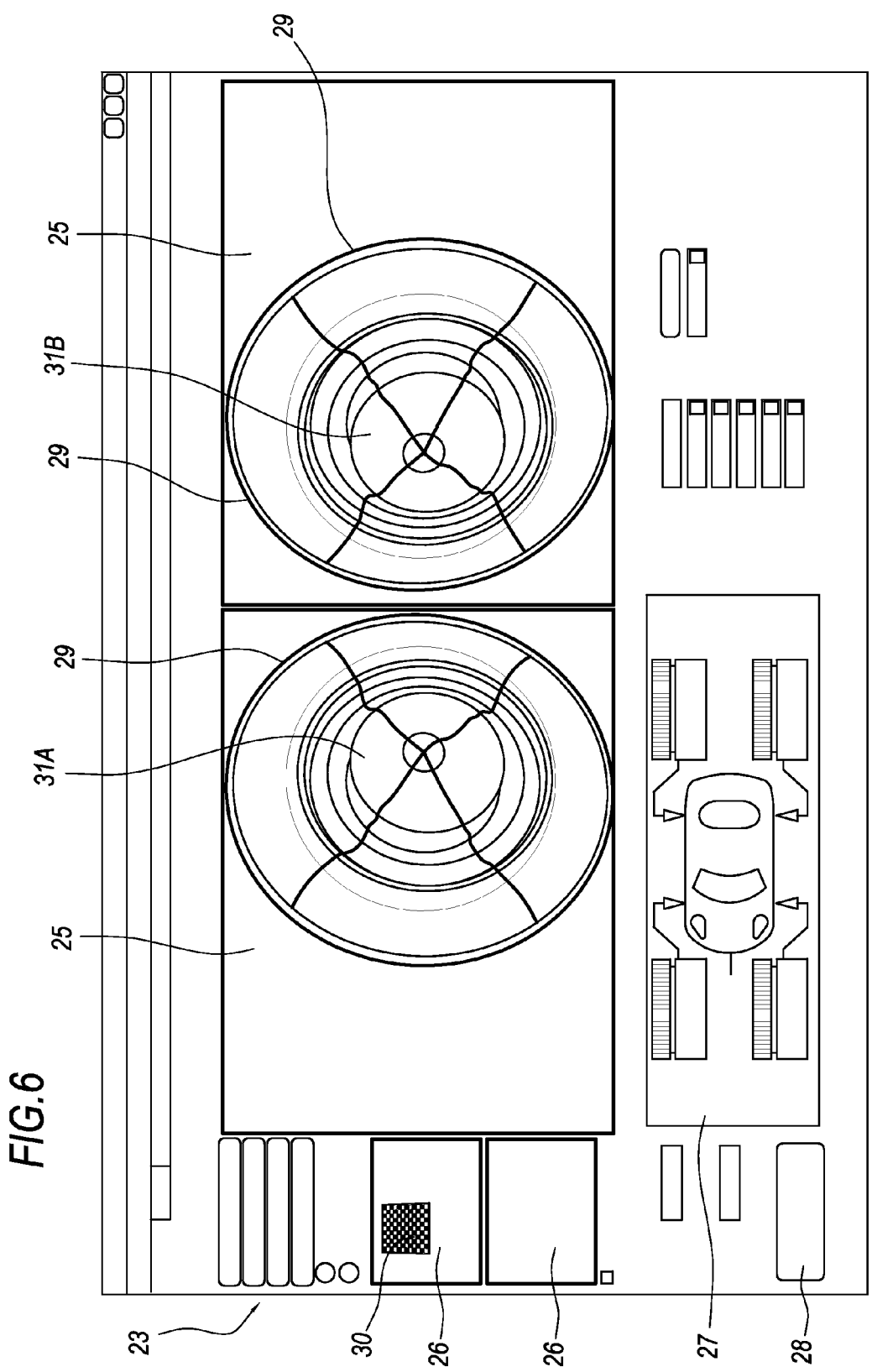
FIG. 6 shows an enlargement of the interface of the mobile unit of FIG. 2.
Figure 7:
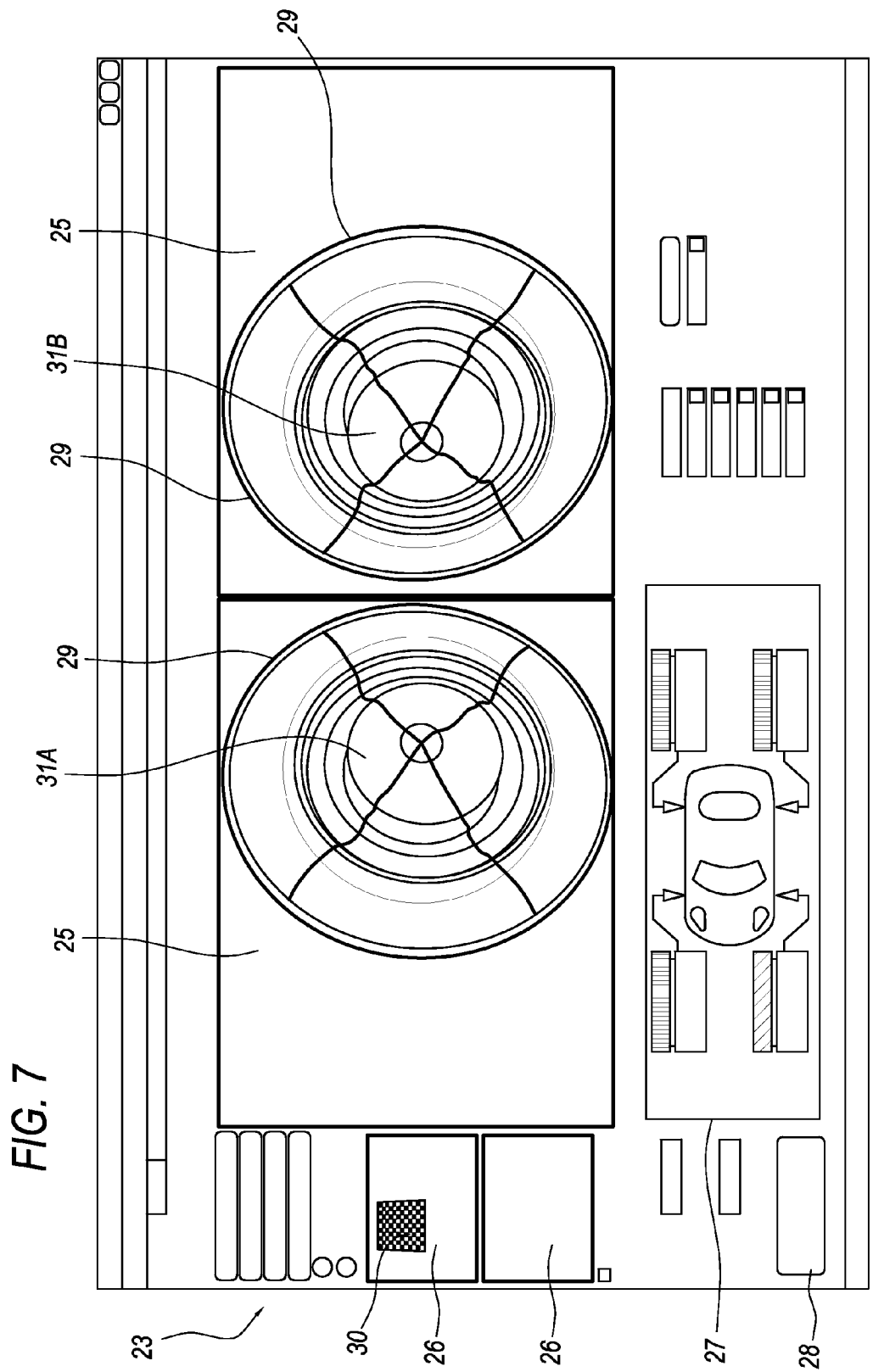
FIG. 7 shows the enlargement of FIG. 6 in a different operating configuration.
Figure 8:
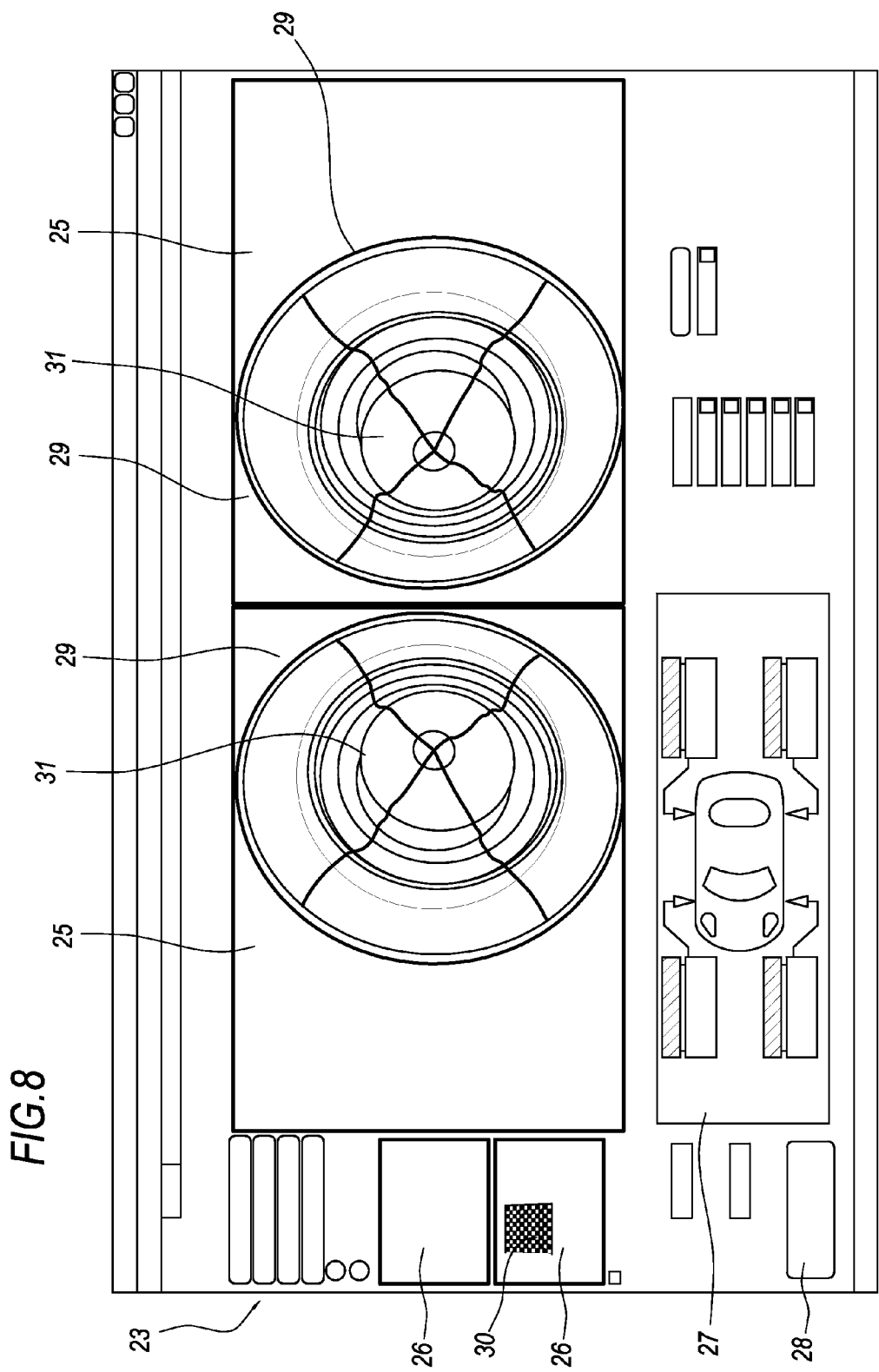
FIG. 8 shows the enlargement of FIG. 6 in a further operating configuration.

In particular, the indications displayed by the interface 23 are illustrated in FIGS. 6-8 and described below.

The interface 23 and the processor 13 are adapted to display a screen page comprising:

wheel 9 framing areas 25 containing the real-time images 31 captured by the measuring cameras 14 (or digital representations of them; in particular, the reference 31A denotes the image of the wheel captured by the left-hand measuring camera 14 and the reference 31B denotes the image of the wheel captured by the right-hand measuring camera 14);

a panel 26 representing the targets 3, containing the real-time images 30 captured by the range cameras 12, or a digital representation of them (in particular, there are two panels 26, corresponding to the two range cameras 12);

an area 27 for displaying a schematic representation (preferably in a plan view) of the vehicle being measured and of the vehicle wheels 9 (or of their positions), preferably indicating the wheel 9 where the mobile unit 4 is currently positioned and the wheels 9 that have already been measured (to avoid the user assigning the measurement results to one of the other wheels by mistake).

In the example representation of the area 27 shown in FIG. 7, the interface 23 indicates that the vehicle's front left-hand wheel has already been measured, while the other wheels 9 have not been measured.

According to the same conventional graphic representation (which is illustrated schematically by way of an example and which is totally arbitrary), in the example of FIG. 6 all the wheels are still to be measured (no measurement has been completed), whereas in the example of FIG. 8, all the measurements have been completed (all the wheels 9 have been measured).

Furthermore, the processor 13 is preferably adapted to calculate, from dimensional data relating to the wheel 9 and stored in the above mentioned memory unit, a reference position of the mobile unit 4 relative to the wheel 9, corresponding to an optimum condition for the measuring means 10 to obtain the measurement parameters.

In the light of the above, the interface 23 is connected to the processor 13 to make available to the user information regarding the real position of the mobile unit 4 relative to the reference position.

In the preferred embodiment illustrated, the interface 23 (together with the processor 13) is adapted to display said reference position in the wheel 9 framing areas 25 (if necessary, laid over the wheel images 31) by means of an ellipse 29 or other geometrical reference shape (preferably a closed shape). That way, when the images of the wheel 9 are displayed in full in the areas 25 and are preferably contained inside the ellipses 29 (and when the images of the targets are at least partly reproduced in the panel 26), the user knows that the position of the mobile unit 4 relative to the wheel 9 (and relative to the targets 3) is the optimum position. The user then gives the command to capture one or more images of the wheel 9 in order to recover the characteristic geometrical parameters to be transmitted to the processor 13.

It should be noted that it is sufficient for one of the two targets 3 to be visible for the measurement to be performed correctly. Hence, in the example of FIGS. 6 and 7, the panel 26 of the interface 23 shows the image 30 of one of the two targets, while in the example of FIG. 8, the panel 26 shows the image 30 of the other target.

It should be noted that the mobile unit 4 also comprises a control element 28 (for example, a pushbutton or a lever) to enter commands necessary to capture the geometrical data of the wheel 9.

In the drawings, the numeral 28 denotes an indicator displayed on the monitor. The processor is programmed to start data capture when the user selects this indicator using the functions of the PC. It should be noted that the indicator 28 may itself constitute a pushbutton, if the monitor is of the touch-screen type.

Below is a description of how the apparatus 1 works.

The vehicle 2 is parked in any working area, even outside the workshop.

After positioning the reference system (consisting of the targets 3) near the vehicle 2, for example, near the front of the vehicle 2 and approximately centred relative to its longitudinal plane or relative to its front registration plate, the mobile unit 4 is positioned near one of the vehicle's wheels 9 (in FIG. 1, the position of the mobile unit shown by way of an example is drawn with a solid line) in such a way as to frame the front left-hand wheel of the vehicle 2 (in the example of FIG. 1) with the measuring cameras 14 and the target 3 of the reference system with one of the range cameras 12. Obviously, measuring can start from any of the wheels 9 and the choice of starting with the front left-hand wheel is totally arbitrary.

The interface 23 displays in real time the images captured by the measuring cameras 14 and by the range cameras 12, thereby helping the user to correctly position the mobile unit 4 (and hence the measuring means 10 associated with it) relative to the wheel 9 to be measured.

For example, if the image of the wheel 9 (displayed in the areas 25 of the interface 23) is too big relative to the field of vision of the measuring cameras 14, a suitable visual signal (for example the above mentioned ellipse or other reference line, or another type signal, for example an audible signal) tells the user driving the mobile unit 4 (manually) to move the unit further away from the wheel 9.

If the image of the wheel 9 is small relative to the field of vision and it is possible to improve the measurement of the wheel 9 by moving the mobile unit 4 closer to the wheel 9, the user is prompted to move closer in the same way as that described above.

Similarly, using the images of the range cameras 12, the apparatus tells the user whether or not the mobile unit 4 or the viewing means 11 (that is, the bar the viewing means 11 are mounted on) need to be turned about their vertical axes.

Once the mobile unit 4 has been positioned correctly, the user acts on the control element 28 to start measuring the position of the wheel 9 and of the reference target 3.

Next, the user moves the mobile unit 4 (continuing to drive it manually) to a second working position in front of one of the vehicle's other wheels 9 (the rear left-hand wheel in the example of FIG. 1) and repeats the procedure described above.

The remaining wheels 9 are measured in the same way, moving the mobile unit 4 to a different working position for each of the wheels (the total number of measuring positions being equal to the number of wheels 9 to be measured).

Once the images of the measuring positions of all the wheels 9 of the vehicle 2 have been captured, the processor 13 (electronic) performs the calculations to obtain the attitude of the vehicle 2, outputs the measured data and the data calculated and compares them with the reference values for the vehicle retrieved from the data base stored in the mass memory unit of the apparatus 1 (or from another data base the processor 13 is designed to connect up to).

According to another aspect of this invention, the apparatus 1 makes it possible to check the attitude of two or more vehicles 2 without having to move them, following the method described below.

First of all, the reference system (that is, the target 3) is positioned near a first vehicle.

Next, as described above, the mobile unit 4 is moved to the working positions necessary to capture the characteristic parameters of the wheels 9 of the first vehicle 2.

At this point, the information relating to the attitude of the first vehicle is already available and it is possible to decide whether or not that vehicle needs adjusting.

Once the first vehicle has been measured, the target 3 can (if necessary) be moved to the second vehicle (to a position where it is visible to the viewing means 11 of the mobile unit 4 from all the working positions corresponding to the wheels 9 of the second vehicle.

Next, the mobile unit 4 is moved to the working positions for measuring the second vehicle.

That way, the attitude checking procedure can be repeated on any number of vehicles without having to move the vehicles to a particular working area.

Thus, the invention also provides a method for checking the attitude of a vehicle 2, comprising the following steps:
  preparing at least one target 3 defining a spatial reference system;
  positioning the target 3 near the vehicle 2;
  preparing a mobile unit 4 equipped with measuring means 10 for measuring the value of parameters representing the geometric characteristics of a vehicle 2 wheel 9 and its position relative to the mobile unit 4 and with means 11 for viewing the at least one target 3;
  preparing a processor 13 connected to the measuring means 10 and to the viewing means 11 for calculating the position and orientation of the wheel 9 relative to the reference system and to obtain characteristic parameter values for the vehicle's attitude.

According to the invention, the method comprises a step of positioning the mobile unit 4 relative to one of the wheels 9 by being manually driven by one user in such a way as to enable the measuring means 10 to measure the value (of the characteristic geometric parameters) and simultaneously allow the viewing means 11 to see the at least one target 3; at the same time, there is a step of displaying in real time to the user driving the mobile unit 4 the information relating to the position of the measuring means 10 relative to the wheel 9 (and preferably also the position of the viewing means 11 relative to the target 3).

Said positioning step is repeated for all the wheels 9 of the vehicle 2 to be measured.

It should be noted that the expression "information relating to the position of the measuring means 10 relative to the wheel 9" means any information telling the user whether or not the measuring means 10 are positioned correctly relative to the wheel 9 and, if not, any information useful to the user to correct the position of the mobile unit 4 (and/or of the measuring means 10 associated with it) relative to the wheel 9.

Similarly, the expression "information relating to the position of the viewing means 11 relative to the target 3" means any information telling the user whether or not the viewing means 11 are positioned correctly relative to the target 3 and, if not, any information useful to the user to correct the position of the mobile unit 4 (and/or of the viewing means 11 associated with it) relative to the target 3.

Preferably, such information is embodied by an interface 23 associated with the mobile unit 4 and preferably (but not necessarily) connected to the processor 13.

The method further comprises the following steps:
moving the target 3 to a position near another vehicle 2 to be checked (after having checked a first vehicle);
repeating the step of positioning the mobile unit 4 for all the wheels 9 of the other vehicle 2 to be measured.

Obviously, after completing each of the positioning steps, the method comprises capturing, through the measuring means 10, the characteristic geometric parameters of the wheel 9 and correlating said data, through the processor 13, with the data measured at the same time by the viewing means 11.

Data capture and processing can be started by a command issued by the user or automatically by the system.

For large vehicles 2, the method comprises fixing the target 3 to the chassis of the vehicle 2 being checked.

Again in the case of large vehicles (such as a lorry and trailer having a total of ten wheels for example) the method also comprises a step of measuring (or capturing), through the measuring means 10, images of at least one portion of the chassis of the vehicle 2 (in addition to measuring and capturing images of the wheel 9).

That makes it possible (again through the processor 13) to generate a representation of the chassis and hence the position and spatial orientation of the chassis relative to the reference system and relative to the wheels.

That way, the positions of the wheels can be referenced to the position of the chassis.

That means, advantageously, that other attitude parameters typical of large vehicles can also be calculated (parameters correlated to the position and alignment of the wheels relative to the chassis).

This invention has several advantages.

First of all, the invention saves a lot of time compared to checking methods currently used, where every vehicle has to be positioned inside the workshop, even on a lift or over a pit.

The invention allows the tyre repairer to check vehicle attitude without necessarily moving the vehicle to a particular area (where a measuring system has been installed). The apparatus according to the invention is therefore extremely flexible and convenient.

Moreover, the invention allows a plurality of vehicles to be checked rapidly one after the other (without even having to move them) so that the tyre repairer can easily identify the vehicles whose attitude requires correction and move only those to specially equipped alignment stations (workshop lift or pit).

What is claimed is:

1. An apparatus (1) for checking the attitude of a vehicle (2), comprising:
    at least one target (3a) defining a spatial reference system;
    a mobile unit (4) equipped with measuring means (10), for measuring the value of parameters representing the geometric characteristics of a vehicle (2) wheel (9) and its position relative to the mobile unit (4), and with means (11) for viewing the at least one target (3);
    a processor (13) connected to the measuring means (10) and to the viewing means (11) for calculating the position and orientation of the wheel (9) relative to the spatial reference system and to obtain characteristic parameter values for the attitude of the vehicle (2);
    an interface (23) associated with the mobile unit (4) and designed to make available in real time to the user manually driving the mobile unit (4) information relating to the position of the measuring means (10) relative to the wheel (9), whereby a user is allowed to manually drive the mobile unit (4) and to position it in the proximity of the wheel (9) according to said information, wherein the mobile unit (4) comprises a trolley (5) equipped with handles or handgrips to make it easier for the user to manually guide the trolley (5) to the desired position in front of the vehicle wheel (9), and wherein said interface (23) comprises a display mounted on the trolley (5).

2. The apparatus according to claim 1, wherein the interface (23) is designed to make available in real time to the user information relating to the position of the viewing means (11) relative to the at least one target (3a).

3. The apparatus according to claim 1, wherein the measuring means (10) comprise at least one camera (14) designed to frame at least one portion of the vehicle (2) being checked and to capture at least one image of the wheel (9), the interface (23) being adapted to tell the user whether the wheel (9) is within the field of vision of the camera (14).

4. The apparatus according to claim 3, wherein the measuring means (10) comprise two cameras (14) in a stereo setup, the processor (13) being designed to generate from the images captured by the cameras (14) a digital representation of the wheel (9) in the spatial reference system.

5. The apparatus according to claim 3, wherein the interface (23) is adapted to display an image captured by the at least one camera (14) and an image captured by the viewing means (11).

6. The apparatus according to claim 3, wherein the processor (13) is adapted to calculate, from dimensional data relating to the wheel (9) and stored in a memory unit, a reference position of the mobile unit (4) relative to the wheel (9), corresponding to an optimum condition for the measuring means (10) to obtain the measurement parameters, the interface (23) being connected to the processor (13) to make available to the user information (29, 31) regarding the real position of the mobile unit (4) relative to the reference position.

7. The apparatus according to claim 1, wherein the interface (23) comprises a screen mounted adjustably on the mobile unit (4) to be oriented in such a way as to facilitate viewing by a user located near the mobile unit (4).

8. The apparatus according to claim 1, wherein:
    the measuring means (10) are associated with a front portion (7) of the mobile unit (4) and are substantially directed in a longitudinal direction towards the outside of the mobile unit (4);
    the viewing means (11) comprise two cameras (12) substantially directed transversally in opposite sideways directions.

9. The apparatus according to claim 1, wherein the at least one target (3a) is fixed to a mounting structure (19) designed to be moved manually by the user to position it near the vehicle (2).

10. The apparatus according to claim 1, comprising, additionally to said at least one target, which constitutes a first target, a second target (3a), for defining the spatial reference system, wherein said first and second targets are fixed to a mounting structure (19) in a predetermined position relative to one another.

11. The apparatus according to claim 1, wherein the trolley (5) is equipped with a plurality of wheels (6), wherein at least one of said wheels (6) is of the swivelling type to make it easier to position the measuring unit.

12. A method for checking the attitude of a vehicle (2), comprising the following steps:
    preparing at least one target (3) defining a spatial reference system;
    positioning the target (3) near the vehicle;
    preparing a mobile unit (4) equipped with measuring means (10) for measuring the value of parameters representing the geometric characteristics of a vehicle (2) wheel (9) and its position relative to the mobile unit and with means (11) for viewing the at least one target (3), wherein the mobile unit (4) comprises a trolley (5) equipped with handles or handgrips;

preparing a processor (13) connected to the measuring means (10) and to the viewing means (11) for calculating the position and orientation of the wheel (9) relative to the spatial reference system and to obtain characteristic parameter values for the attitude of the vehicle;

manually driving the mobile unit (4) to position it relative to one of the wheels (9), in such a way as to enable the measuring means (10) to measure the value and simultaneously allow the viewing means (11) to see the at least one target (3);

displaying in real time to a user who is manually driving the mobile unit (4) information relating to the position of the measuring means (10) relative to the wheel (9), said positioning step being repeated for all the wheels (9) on the vehicle (2) to be measured, wherein the step of displaying the information is performed by an interface (23) associated with the mobile unit (4) and connected to the processor (13), wherein said interface (23) comprises a display mounted on the trolley (5).

13. The method according to claim 12, comprising displaying in real time to the user information relating to the position of the viewing means (11) relative to the target (3).

14. The method according to claim 12, further comprising the following steps:
moving the target (3) to a position near another vehicle to be checked;
repeating the positioning step for all the wheels of said other vehicle to be measured.

15. The method according to claim 12, wherein positioning the target (3) comprises fixing it to the vehicle being checked.

16. An apparatus (1) for checking the attitude of a vehicle (2), comprising:
at least one target (3a) defining a spatial reference system;
a mobile unit (4) equipped with measuring means (10), for measuring the value of parameters representing the geometric characteristics of a vehicle (2) wheel (9) and its position relative to the mobile unit (4), and with means (11) for viewing the at least one target (3);
a processor (13) connected to the measuring means (10) and to the viewing means (11) for calculating the position and orientation of the wheel (9) relative to the spatial reference system and to obtain characteristic parameter values for the attitude of the vehicle 2;
an interface (23) associated with the mobile unit (4) and designed to make available in real time to the user manually driving the mobile unit (4) information relating to the position of the measuring means (10) relative to the wheel (9), whereby a user is allowed to manually drive the mobile unit (4) and to position it in the proximity of the wheel (9) according to said information, wherein the interface (23) and the processor (13) are adapted to display a screen page comprising:
a wheel (9) framing areas (25) containing real-time images (31) captured by measuring cameras (14), or a digital representation thereof;
a panel (26) representing the targets (3), containing real-time images (30) of the targets captured by range cameras (12), or digital representations thereof.

17. The apparatus (1) of claim 16, wherein the interface (23) and the processor (13) are adapted to display said screen page additionally comprising an area (27) for displaying a schematic representation of the vehicle being measured and of the vehicle wheels (9) or of the position thereof, indicating the wheel (9) where the mobile unit (4) is currently positioned and the wheels (9) that have already been measured.

18. A method for checking the attitude of a vehicle (2), comprising the following steps:
preparing at least one target (3) defining a spatial reference system;
positioning the target (3) near the vehicle;
preparing a mobile unit (4) equipped with measuring means (10) for measuring the value of parameters representing the geometric characteristics of a vehicle (2) wheel (9) and its position relative to the mobile unit and with means (11) for viewing the at least one target (3);
preparing a processor (13) connected to the measuring means (10) and to the viewing means (11) for calculating the position and orientation of the wheel (9) relative to the spatial reference system and to obtain characteristic parameter values for the attitude of the vehicle;
manually driving the mobile unit (4) to position it relative to one of the wheels (9), in such a way as to enable the measuring means (10) to measure the value and simultaneously allow the viewing means (11) to see the at least one target (3);
displaying in real time to a user who is manually driving the mobile unit (4) information relating to the position of the measuring means (10) relative to the wheel (9), said positioning step being repeated for all the wheels (9) on the vehicle (2) to be measured, wherein the step of displaying the information is performed by an interface (23) associated with the mobile unit (4) and connected to the processor (13), wherein the interface (23) and the processor (13) are adapted to display a screen page comprising:
a wheel (9) framing areas (25) containing real-time images (31) captured by measuring cameras (14), or a digital representation thereof;
a panel (26) representing the targets (3), containing real-time images (30) of the targets captured by range cameras (12), or digital representations thereof.

19. The method of claim 18, wherein the interface (23) and the processor (13) are adapted to display said screen page additionally comprising an area (27) for displaying a schematic representation of the vehicle being measured and of the vehicle wheels (9) or of the position thereof, indicating the wheel (9) where the mobile unit (4) is currently positioned and the wheels (9) that have already been measured.

* * * * *